(12) United States Patent
Smith et al.

(10) Patent No.: US 8,659,546 B2
(45) Date of Patent: Feb. 25, 2014

(54) METHOD AND APPARATUS FOR TRANSFERRING DIGITAL CONTENT

(75) Inventors: Randall B. Smith, Palo Alto, CA (US); Robert F. Tow, Los Gatos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/372,284

(22) Filed: Feb. 13, 2012

(65) Prior Publication Data

US 2012/0144073 A1   Jun. 7, 2012

Related U.S. Application Data

(63) Continuation of application No. 11/111,390, filed on Apr. 21, 2005.

(51) Int. Cl.
   *G09G 5/00* (2006.01)

(52) U.S. Cl.
   USPC ........... 345/156; 345/157; 345/158; 382/103; 710/33; 710/72; 710/73

(58) Field of Classification Search
   USPC ....................................... 345/156; 178/18.01
   See application file for complete search history.

(56) References Cited

U.S. PATENT DOCUMENTS

| | | | |
|---|---|---|---|
| 4,414,537 A | 11/1983 | Grimes | |
| 4,843,568 A | 6/1989 | Krueger et al. | |
| 5,097,252 A | 3/1992 | Harvill et al. | |
| 5,319,747 A | 6/1994 | Gerrissen et al. | |
| 5,412,619 A | 5/1995 | Bauer | |
| 5,579,481 A | 11/1996 | Drerup | |
| 5,581,484 A | 12/1996 | Prince | |
| 5,714,698 A | 2/1998 | Tokioka et al. | |
| 5,914,701 A | 6/1999 | Gersheneld et al. | |
| 6,049,327 A | 4/2000 | Walker et al. | |
| 6,088,730 A | 7/2000 | Kato et al. | |
| 6,098,886 A | 8/2000 | Swift et al. | |
| 6,126,572 A | 10/2000 | Smith | |
| 6,151,208 A | 11/2000 | Bartlett | |
| 6,222,465 B1 | 4/2001 | Kumar et al. | |
| 6,223,018 B1 | 4/2001 | Fukumoto et al. | |
| 6,233,611 B1 | 5/2001 | Ludtke et al. | |
| 6,285,757 B1 | 9/2001 | Carroll et al. | |
| 6,380,923 B1 | 4/2002 | Fukumoto et al. | |
| 6,424,334 B1 | 7/2002 | Zimmerman et al. | |
| 6,681,031 B2 * | 1/2004 | Cohen et al. | 382/103 |
| 6,754,472 B1 | 6/2004 | Williams et al. | |
| 6,850,162 B2 | 2/2005 | Cacioli et al. | |

(Continued)

OTHER PUBLICATIONS

Rekimoto, J., "Pick-and-Drop: A Direct Manipulation Technique for Multiple Computer Environments," UIST '97, Alberta, Canada, Oct. 1997, 9 pages.

*Primary Examiner* — Grant Sitta

(74) *Attorney, Agent, or Firm* — Osha Liang LLP

(57) ABSTRACT

A method for transferring digital content, involving defining a first region of space associated with a first device and a second region of space associated with a second device, wherein the first device includes digital content to be transferred to the second device, performing a first action within the first region, obtaining the digital content to be transferred from the first device in response to performing the first action to obtain captured digital content, performing a second action within the second region, and transferring the captured digital content to the second device in response to performing the second action.

20 Claims, 3 Drawing Sheets

(56) References Cited

U.S. PATENT DOCUMENTS

| | | |
|---|---|---|
| 6,874,037 B1 | 3/2005 | Abram et al. |
| 7,042,438 B2 | 5/2006 | McRae et al. |
| 7,058,204 B2 | 6/2006 | Hildreth et al. |
| 7,222,198 B2 | 5/2007 | Stavely et al. |
| 7,227,526 B2 | 6/2007 | Hildreth et al. |
| 7,254,376 B2 | 8/2007 | Park et al. |
| 7,295,181 B2 | 11/2007 | Alsio |
| 7,301,526 B2 | 11/2007 | Marvit et al. |
| 7,301,527 B2 | 11/2007 | Marvit |
| 7,307,527 B2 | 12/2007 | Forster |
| 7,312,788 B2 | 12/2007 | Fleischmann et al. |
| 7,333,090 B2 | 2/2008 | Tanaka et al. |
| 7,405,725 B2 | 7/2008 | Mohri et al. |
| 7,460,690 B2 | 12/2008 | Cohen et al. |
| 7,514,001 B2 | 4/2009 | Costa et al. |
| 7,565,295 B1 | 7/2009 | Hernandez-Rebollar |
| 2002/0054175 A1 | 5/2002 | Miettinen et al. |
| 2003/0028672 A1 | 2/2003 | Goldstein |
| 2003/0055977 A1 | 3/2003 | Miller |
| 2003/0095154 A1 | 5/2003 | Colmenarez |
| 2003/0149803 A1 | 8/2003 | Wilson |
| 2004/0046736 A1 | 3/2004 | Pryor et al. |
| 2004/0068567 A1 | 4/2004 | Moran et al. |
| 2004/0243342 A1 | 12/2004 | Rekimoto |
| 2005/0093868 A1* | 5/2005 | Hinckley ...................... 345/502 |
| 2005/0219211 A1 | 10/2005 | Kotzin et al. |
| 2005/0219223 A1* | 10/2005 | Kotzin et al. .................. 345/173 |
| 2005/0275636 A1 | 12/2005 | Dehlin et al. |
| 2006/0013483 A1 | 1/2006 | Kurzweil et al. |
| 2006/0028429 A1* | 2/2006 | Kanevsky et al. ............ 345/156 |
| 2006/0165405 A1 | 7/2006 | Kanai et al. |
| 2006/0192772 A1* | 8/2006 | Kambayashi ................. 345/179 |
| 2007/0057912 A1 | 3/2007 | Romriell et al. |

\* cited by examiner

METHOD AND APPARATUS FOR TRANSFERRING DIGITAL CONTENT

CROSS-REFERENCE TO RELATED APPLICATIONS

This application is a continuation of U.S. patent application Ser. No. 11/111,390, entitled: "METHOD AND APPARATUS FOR TRANSFERRING DIGITAL CONTENT" and filed on Apr. 21, 2005. Accordingly, this application claims benefit from U.S. patent application Ser. No. 11/111,390 under 35 U.S.C. §120.

BACKGROUND

As wireless devices become physically smaller and more complex, these wireless devices do little to reflect its state or present a direct affordance for programming and configuration. For example, consider the scenario of replacing a wireless light switch. Suppose that the wireless light switch is not only configured to turn on a specific set of outside lights when a physical switch is thrown, but also configured to activate lights when motion sensors detect a possible visitor in the darkness, and activate lights automatically based on the time of day. In this example, a fairly simple device contains significant programming and configuration information. In order to replace the wireless light switch, typically, this programming and configuration information is looked up and/or transferred from the wireless light switch to an intermediate device, such as a computer. The information is subsequently transferred from the intermediate device to the replacement switch. In some cases, this type of transfer may require the user transferring the state and configuration information to have specific knowledge about how to look-up and transfer this information and perform several time-consuming actions to replace the wireless light switch.

As another example, consider the simple task of replacing one wireless device with another wireless device. In contrast, in the current state of the art, consider the scenario in which an old personal digital assistant (PDA) is replaced with a new PDA. In order to transfer the state and configuration information of the old PDA into the new PDA, a user may be required to use an intermediate device (e.g., a computer) to program and configure the new PDA. Specifically, the old PDA is docked on a computer, the information from the old PDA is transferred to the computer using the keyboard and other input devices associated with the computer, and the old PDA is subsequently undocked. Further, the old PDA's state and how the old PDA was configured must be known to the user. Specifically, the configuration of the old PDA may include which other devices the old PDA communicates with and how this communication is performed. Upon determining this information, a user can effectively copy state and configuration information into the new PDA. Then, the new PDA is docked and the information is transferred to the new PDA. Thus, again, the user may be required to determine the specifics of each of the PDAs in order to effectively transfer the state and content from the old PDA to the new PDA.

SUMMARY

In general, in one aspect, the invention relates to a method for transferring digital content, comprising defining a first region of space associated with a first device and a second region of space associated with a second device, wherein the first device comprises digital content to be transferred to the second device, performing a first action within the first region, obtaining the digital content to be transferred from the first device in response to performing the first action to obtain captured digital content, performing a second action within the second region, and transferring the captured digital content to the second device in response to performing the second action.

In general, in one aspect, the invention relates to a system for transferring digital content, comprising a first device comprising digital content to be transferred to a second device, a user configured to perform a first action resulting in the capture of the digital content to be transferred from the first device to obtain captured digital content, wherein the user is further configured to perform a second action resulting in the transfer of the captured digital content to the second device, and a detection object configured to detect and interpret the first action and the second action.

In general, in one aspect, the invention relates to a method for removing digital content, comprising defining a first region of space associated with a first device, wherein the first device comprises digital content to be removed from the first device, performing a first action within the first region, denoting the digital content to be removed from the first device in response to performing the first action, and removing the digital content from the first device in response to performing the first action.

Other aspects of the invention will be apparent from the following description and the appended claims.

DETAILED DESCRIPTION

Figure 1A:
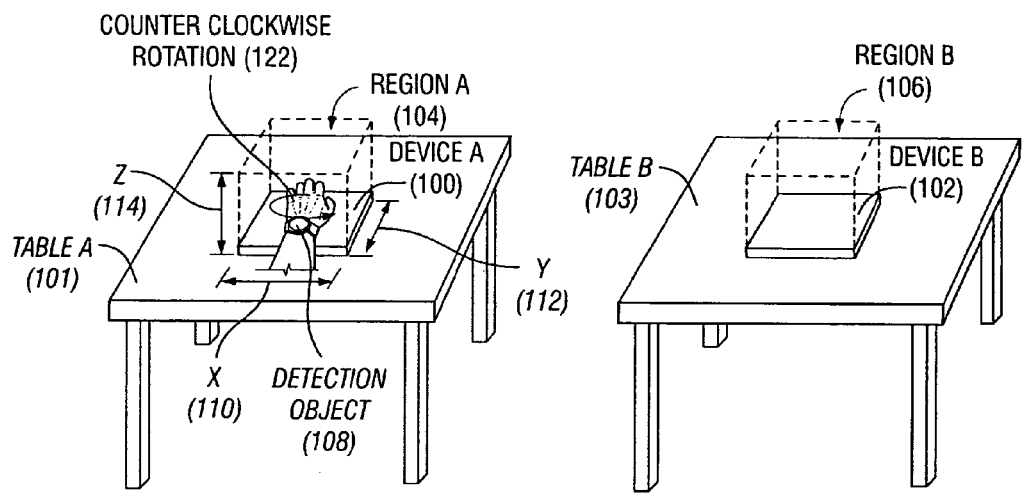
FIGS. 1A and 1B show a system for transferring digital content using a user device in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to providing a user interface to transferring digital content from one device to another device directly. Specifically, one or more embodiments of the invention relate to the direct manipulation of software by performing actions that result in the transfer of digital content from one device to another device or the removal of digital content from a device. More specifically, embodiments of the invention relate to capturing software by performing actions that are interpreted by a detection object, and transferring or removing the captured digital content by performing similar actions.

Figure 1B:
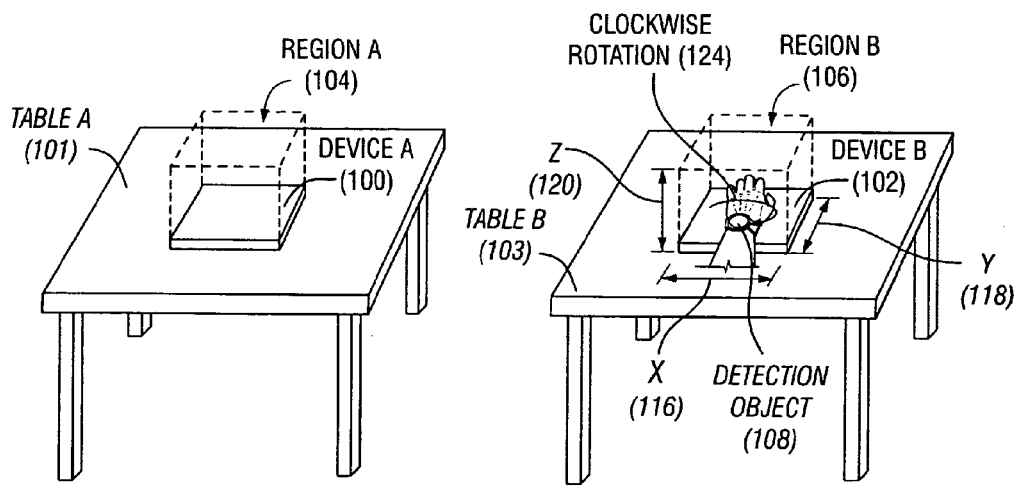

FIGS. 1A and 1B show a system for transferring digital content in accordance with one embodiment of the invention. Specifically, FIG. 1A shows two devices (i.e., Device A (100), Device B (102)), where each device is supported on two separate tables (i.e., Table A (101), Table B (103)). Device A (100) and Device B (102) may be any type of device, including personal devices, house hold devices, command and control devices, etc.

In one embodiment of the invention, the system of FIG. 1A is used to transfer digital content from Device A (100) to Device B (102). Those skilled in the art will appreciate that the devices may be located greater distances away from each other, e.g., the devices may be on the same network but physically distanced from each other. Further, although only two devices are shown in the Figures, there may be more than two devices to/from which digital content is obtained and subsequently transferred. In addition, although FIGS. 1A and 1B show the devices supported by tables, those skilled in the art will appreciate that the device may be supported by any suitable support means, including human hands, shelves, etc. In one embodiment of the invention, digital content obtained and transferred may be a program information, the state of a device, and data stored on the device (e.g., digital music files, digital video, etc.).

In one embodiment of the invention, digital content is obtained from Device A (100) by detecting and interpreting actions performed by a user in the presence of Device A (100). In one embodiment of the invention, an action may be a physical gesture, such as one or more rotations of a hand in a clockwise/counterclockwise direction, a grabbing motion of a hand, a dropping motion of hand, the blink of an eye, etc. Further, actions performed by a user may involve a voice recognition interface where a user uses his/her voice to obtain digital content from Device A (100) and transfer digital content to Device B (102).

In FIG. 1A, the action shown is a physical gesture represented by the rotation of the hand in a counterclockwise direction (122), which results in obtaining digital content from Device A (100). In one embodiment of the invention, the actions performed by a user are used to designate the source and the destination of the digital content (i.e., digital content obtained from Device A (100) and transferred to Device B (102)). Further, in one embodiment of the invention, the actions performed by a user correspond to a user interface that the user can use to obtain digital content from a device. For example, consider a user interface such as a drop-down menu or a bookmark. In one embodiment of the invention, the physical gesture of a clockwise hand rotation three times in the defined region of space associated with a device may correspond to selecting a particular file from a drop-down menu.

In one embodiment of the invention, actions are performed by a user in a defined region of space associated with Device A (100) (i.e., Region A (104)). For example, in FIG. 1A, Region A (104) is associated with Device A (100) and is shown as a three-dimensional area above Device A (100). More specifically, Region A (104) is defined using particular dimensions of width (x (110)), length (y (112)), and height (z (114)) above Device A (100). For example, if the length (y (112)) and width (x (110)) associated with Device A (100) are 6 inches by 10 inches, respectively, then Region A (104) may be defined as 6 inches (length) by 10 inches (width) by 5 inches (height).

Those skilled in the art will appreciate that a defined region of space associated with a device may be specified in any unit (i.e., metric units, English units, etc.). In one embodiment of the invention, a defined region of space may be specified as a percentage of the dimensions of the device with which the defined region of space is associated. For example, if a particular device is 12 centimeters by 15 centimeters, then the height of the defined region of space associated with the device may be a percentage of the length and width of the device. Alternatively, in one embodiment of the invention, a defined region of space may be unrelated to an associated device's measurements. For example, the region of space may extend beyond the edge of the device. Further, if the device is very large in surface area, the height of the defined region of space may be short, whereas if the device is small, the height may be taller. Those skilled in the art will appreciate that the defined region of space associated with a particular device may be located in any region that is spatially near the device from which digital content is to be obtained or transferred. For example, a defined region of space associated with a device may be to the side of the device, beneath the device, etc. Further, those skilled in the art will appreciate that a defined region of space associated with different devices may be of different dimensions and located in different areas relative to each device.

Continuing with FIG. 1A, in one embodiment of the invention, when an action is performed within a defined region of space of a device, the action is detected and interpreted by a detection object (i.e., Detection Object (108)). In one embodiment of the invention, Detection Object (108) is a device worn by a user that includes functionality to communicate with both Device A (100) and Device B (102). For example, the detection object (e.g., Detection Object (108)) may be a wearable computer in the form of a wrist watch, a wrist band, a ring, etc. In FIG. 1A, Detection Object (108) is shown as a wrist watch. In one embodiment of the invention, the detection object (108) may include a radio and a control computer, which includes functionality to detect when the detection object (108) is physically close to (i.e., spatially near) a device (e.g., Device A (100), Device B (102)). For example, because of the strength of the radio, the presence of a magnetic field, etc., the detection object (108) is capable of determining that it is physically near Device A (100). In one embodiment of the invention, the detection object provides only a portion of the information while the remainder of the information is provided by a detection device, as described in FIGS. 2A and 2B. For example, consider the scenario in which a user wearing a ring that includes a magnet performs an action in a defined region of space associated with a device. In this case, a magnetic field radiated by the magnet in the user's ring may be detected using detection device, such as a magnetic field detector, that includes functionality to interpret the actions performed by the user. Further, the ring may include functionality to store the captured digital content from a device.

Upon determining that Device A (100) is near, the detection object (108) includes functionality to determine the unique identity of Device A (100). In one embodiment of the invention, the detection object (108) may read a bar code or an RFID tag on each device, perform an optical recognition task, or communicate directly with Device A (100) over a network to determine the unique identity of Device A (100). Those skilled in the art will appreciate that there may be several other ways that the detection object determines a unique ID associated with another device, such as using an Ethernet cable to determine a device's IP address, etc.

Further, in one embodiment of the invention, the detection object (108) may include a mechanism to detect and interpret the actions performed by a user. For example, in one embodiment of the invention, the detection object (108) may detect physical gestures using embedded accelerometers that are able to parse the actions being performed by a user. In one embodiment of the invention, if power is unavailable to one more devices, the detection object (108) may use passive methods to determine unique device IDs to identify devices.

Figure 2A:
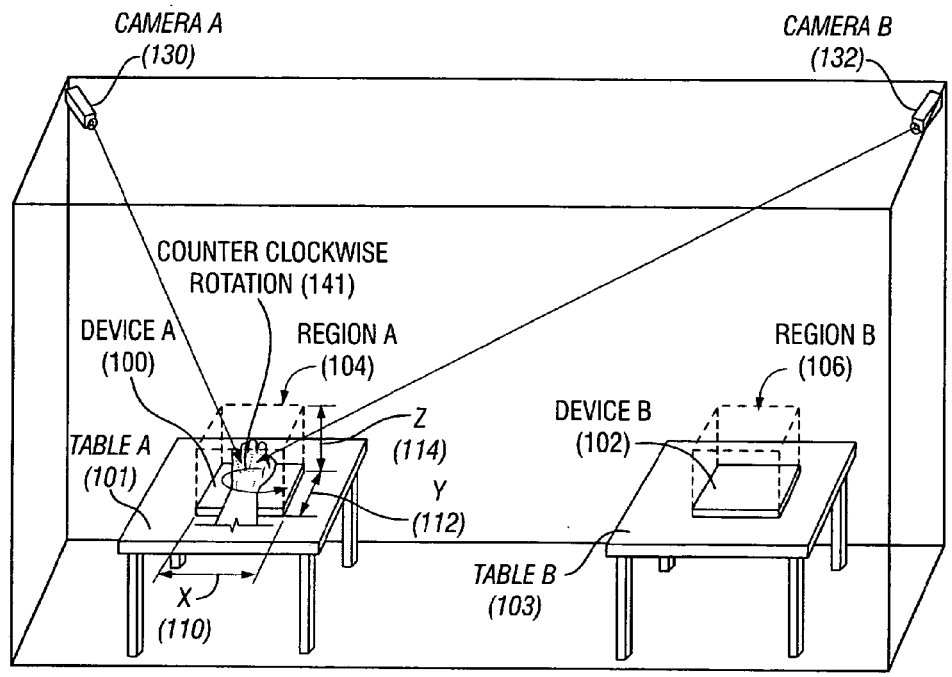
FIGS. 2A and 2B show a system for transferring digital content using cameras in accordance with one embodiment of the invention.
Figure 2B:
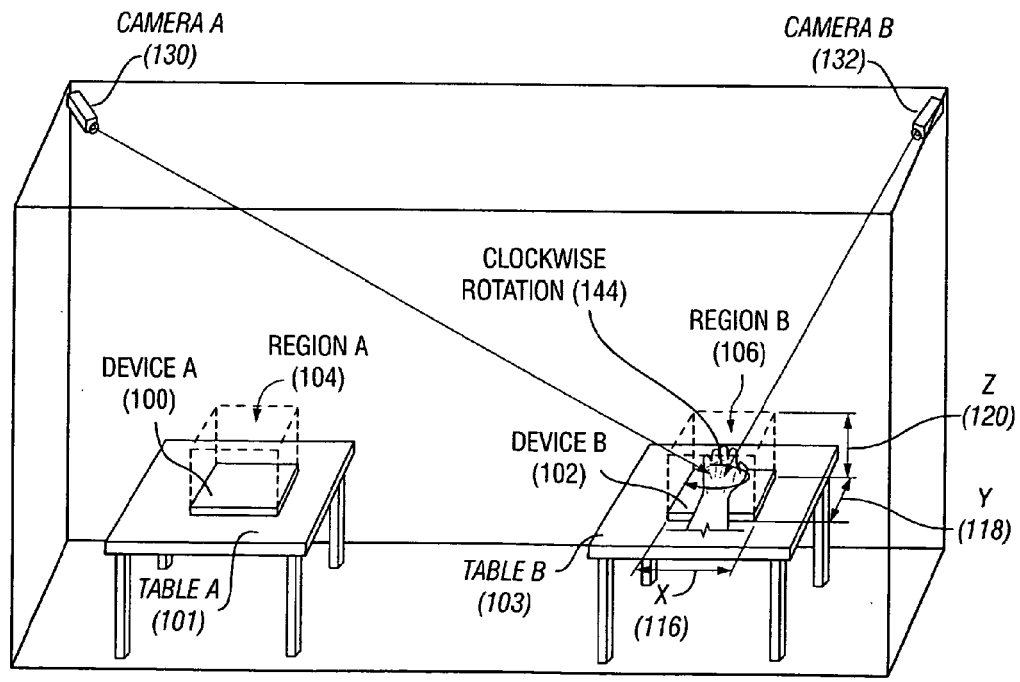

Those skilled in the art will appreciate that the detection object may be any device capable of communicating with other devices and may or may not be worn by a user (for example, see FIGS. 2A, 2B). Further, those skilled in the art will appreciate that the detection object may be part of a larger network. For example, detection object (108) shown in FIG. 1A, may connect to the Internet using the user's cell phone as a gateway. Further, in one embodiment of the invention, the detection object (108) may include functionality to denote (i.e., mark) digital content stored on a device such that the marked digital content is later transferred to another device. For example, a user may perform an action near Device A that denotes particular digital content on Device A. Subsequently, the user may perform an action near Device B at some later time, which results in the marking of digital content on Device B. Marking these two devices, an action may be performed to initiate a direct transfer of the denoted digital data from Device A to Device B. Alternatively, the detection device (108) may store the denoted digital content from one device until a user performs an action to transfer the stored digital content to one or more devices at some later time.

In FIG. 1B, the digital content obtained from Device A (100) is transferred to Device B (102). In one embodiment of the invention, to transfer the digital content to Device B (102), detection object (108) determines that it is near Device B (102) and the unique identity of Device B (102), and an action is again performed by the user in Region B (106), which represents the defined region of space associated with Device B (102). Region B (106) is defined using particular dimensions of width (x (116)), length (y (118)), and height (z (120)) above Device B (102). The action shown in FIG. 1B represents a physical gesture of a clockwise rotation of a hand (124), which corresponds to a user interface that allows the transfer of the captured digital content from Device A (100). In a manner similar to the description provided above, the action performed in Region B (106) is detected and interpreted by Detection Object (108). Those skilled in the art will appreciate that the transfer of digital content from one device to another device may be performed using the same or different actions. For example, a user may perform a physical gesture to capture digital content from one device, and subsequently use a voice interface to download the captured digital content to another device. Further, those skilled in the art will appreciate that the transfer of digital content may not occur immediately. Rather, digital content may be stored or marked for transfer to one or more devices at some later point in time. In this case, digital content may be stored on a detection object, on a central services database associated with the detection object, etc.

Further, in one embodiment of the invention, performing actions in defined regions of space for two or more devices may result in establishing a direct connection between the devices. In this case, once a user has established a direct connection, the devices may directly communicate with each other to transfer digital content to/from one or more devices. For example, in one embodiment of the invention, Device A (100), Device B (102), and the detection object (108) may form a network (e.g., a mesh network, a cluster network, etc.), where each device is directly connected to each of the other devices and all the devices can communicate directly with each other. In this case, actions performed in a defined region of space associated with Device A (100) or Device B (102) are parsed by detection object (108), and may result in establishing a direct link between Device A (100) and Device B (102).

FIGS. 2A and 2B show a system for transferring digital content from Device A (100) to Device B (102) using detection devices (e.g., Camera A (130), Camera B (132)) in accordance with one embodiment of the invention. Specifically, when actions are performed in defined region of spaces associated with one or more devices, the detection devices (e.g., Camera A (130) and Camera B (132)) include functionality to analyze the scene and record the actions performed by a user. In FIGS. 2A and 2B, Camera A (130) and Camera B (132) are shown mounted in the corners of a room in which both Device A (100) and Device B (102) are located. Again, Device A (100) and Device B (102) are shown supported by Table A (101) and Table B (103), respectively. Further, in one embodiment of the invention, the cameras are monitored by a computer system configured to store information associated with Device A (100) and Device B (102). Those skilled in the art will appreciate that only one detection device may exist and/or the detection devices may be located in different areas than that shown in FIGS. 2A and 2B, such as directly above the devices, to the side of the devices, etc. Further, those skilled in the art will appreciate that although FIGS. 2A and 2B show cameras as detection devices, detection devices may also include other devices such as ultrasound, etc.

FIG. 2A shows a user capturing digital content from Device A (100), where Region A (104) represents the defined region of space associated with Device A (100). As described above, Region A (104) is defined using a length (x (110)), width (y (112)), and height (z (114)) relative to Device A (100). In one embodiment of the invention, each detection device (e.g., Camera A (130), Camera B (132)) includes functionality to determine the position of a user's hand (or other part of the user) used to perform an action in a defined region of space. Those skilled in the art will appreciate that detection devices may determine the position of a user performing a physical gesture using commonly known methods not within the scope of the present invention to judge the relative position of an object with respect to other known dimensions (e.g., depth perception techniques, high spatial frequency, etc.).

In one embodiment of the invention, when a user performs an action in Region A (104), the detection devices (e.g., Camera A (130), Camera B (132)) record the action performed and the associated computer system captures the digital content (i.e., a handle or copy of the program information, state information, data, etc. is obtained) corresponding to the action performed. The action shown in FIG. 2A is a physical gesture of a counterclockwise hand rotation (141). In one embodiment of the invention, commonly known techniques are used to determine the relative position of the user's hand with respect to Region A (104). At this stage, the computer system associated with Camera A (130) and Camera B (132) compares the coordinates of Region A (104) with the coordinates of the user's hand to determine whether the user's hand falls within Region A (104). If the user's hand falls within Region A (104), then the user's actions are detected and interpreted to obtain digital content from Device A (100). Alternatively, if the user's hand is not within Region A (104), then the cameras (i.e., Camera A (130), Camera B (132)) do not detect actions performed by the user.

FIG. 2B shows the user transferring digital content captured from Device A (100) to Device B (102). In FIG. 2B, the user's action to transfer digital content is performed in Region B (106), which is defined using a length (x (116)), width (y (118)), and height (z, (120)) relative to Device B (102). The action shown in FIG. 2B is a physical gesture of a clockwise hand rotation (144). As described above, commonly known techniques, which are outside the scope of the present, may be used to determine the location of Region B (106). Similarly, the detection devices are able to judge the position of a user's hand (or other part of the user) relative to the defined region of space associated with a device. Thus, if the user's hand performs an action within Region B (106), then the detection devices (e.g., Camera A (103), Camera B (132)) detect and interpret the action and the captured digital content from Device A (100) is downloaded onto Device B (102). Those skilled in the art will appreciate that the digital content captured from Device A (100) may not be immediately transferred to Device B (102). In this case, in one embodiment of the invention, the digital content from Device A (100) may be stored in the computer system associated with the detection device or any suitable computer system until the digital content is transferred to Device B (102).

Those skilled in the art will appreciate that the user experience (i.e., the experience of the user transferring or removing digital content) involves performing actions spatially near one or more devices to mark, capture, transfer, and/or remove digital content. Physically, a user performs an action near a device and captures the digital content represented by a cloud of ectoplasm hovering over a device. Subsequently, a user may transfer the content in the same manner, i.e., by physically performing an action that drops the captured cloud of ectoplasm into another device. Thus, the user experience is represented by the metaphor of capturing and transferring a cloud of ectoplasm, as if the digital content is something a user can just grab out of the air near one device and project into another device.

Figure 3:
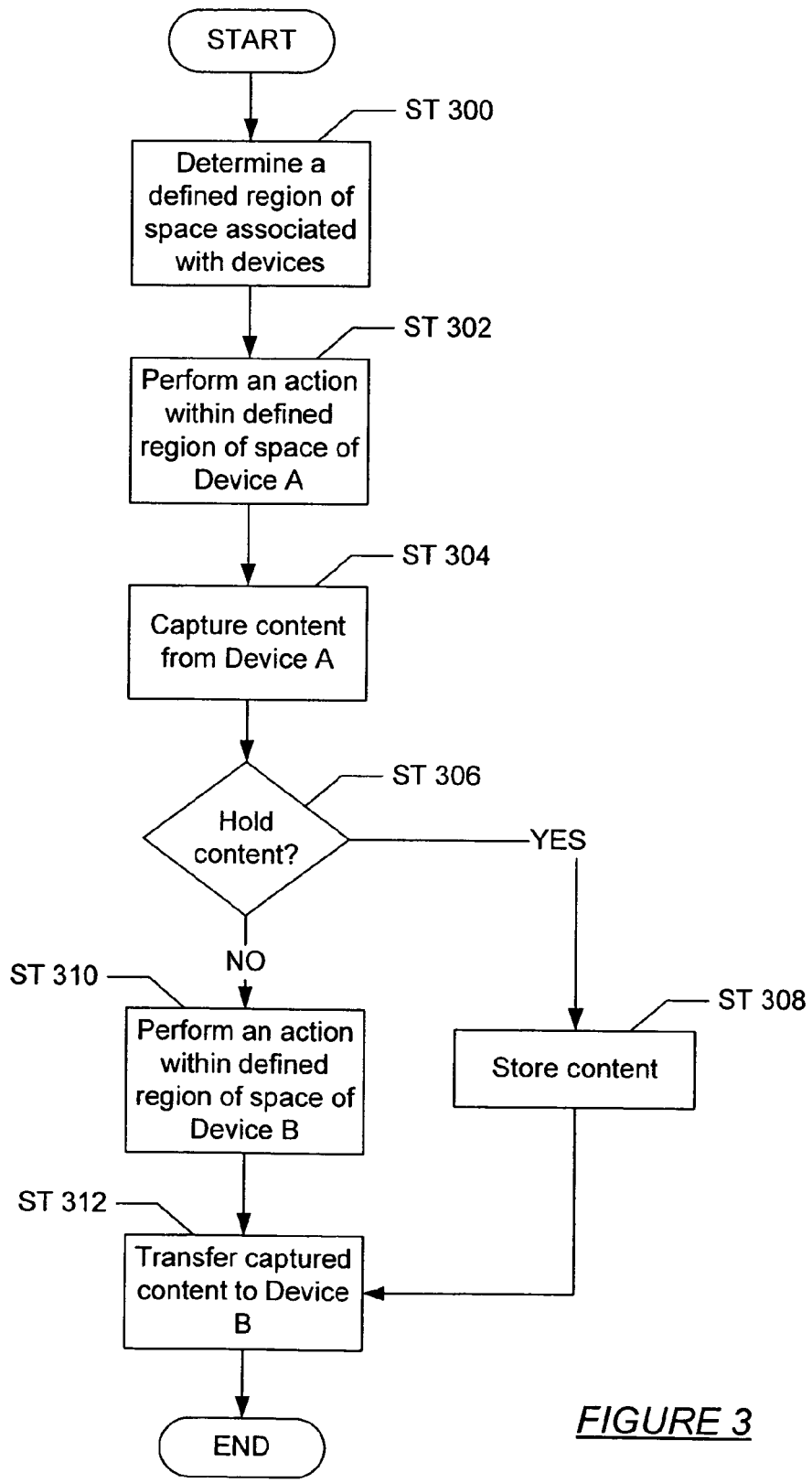
FIG. 3 shows a flow chart for transferring digital content in accordance with one embodiment of the invention.

FIG. 3 shows a flow chart for transferring digital content from one device to another device in accordance with one embodiment of the invention. Suppose for purposes of FIG. 3, that digital content is being obtained from Device A and transferred to Device B. Initially, a defined region of space is determined for Device A and Device B (Step 300). As described above, a defined region of space may be defined using any units of measure. Subsequently, a user performs an action within the defined region of space for Device A (Step 302). The action performed by the user may be a physical gesture that is detected and interpreted by one or more other devices in proximity to Device A (i.e., a detection object, one or more detection devices, etc.). As a result of the physical gestures performed, digital content is captured from Device A (Step 304). Specifically, a handle to or a copy of the digital content (e.g., resident program, configuration information, etc.) is obtained from Device A.

At this stage, a determination is made whether the digital content is to be held (Step 310) or immediately transferred to Device B. In one embodiment of the invention, a user may decide to hold the digital content captured from Device A (Step 310), in which case the digital content may be stored in a user device (Step 312). For example, if Device A and Device B are far away from each other, or the digital content is to be transferred at some later time, the user may store the digital content captured from Device A in a user device, such as a wrist band, ring, wristwatch, a computer system associated with a detection device, etc. In this case, the user device may include memory to store the digital content captured from Device A.

Continuing with FIG. 3, if the digital content is to be transferred to Device B immediately, then the user performs an action with in the defined region of space associated with Device B (Step 306). Again, the action performed may be a physical gesture that is detected and interpreted by another device. Detection and interpretation of the physical gesture may be performed in a variety of ways, as described above in FIGS. 1A, 1B, 2A, and 2B. As a result of the physical gesture performed within the defined region of space associated with Device B, the captured digital content from Device A is downloaded to Device B (Step 308).

Those skilled in the art will appreciate that while FIG. 3 discusses transferring digital content from one device to another device, a similar procedure is used to remove content from a device. For example, in one embodiment of the invention, digital content may be denoted (i.e., marked) by performing an action in order to remove digital content from a device at some later point in time. In this case, a user may perform a physical gesture to denote particular digital content and subsequently perform another action to erase the denoted digital content from the device (i.e., send the digital content to the trash bin on the device, etc.). Alternatively, a particular physical gesture may correspond to a delete or erase command, which removes the denoted digital content from the device immediately.

Embodiments of the invention provide a user interface for a user to transfer digital content from one or more devices to one or more different devices, without the use of a display screen or keyboard. Further, one or more embodiments of the invention allow a user to directly manipulate software to obtain and transfer digital content with the use of physical gestures that are interpreted by another device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring digital content, comprising:
defining, by an external detection device, a volume of space associated with a first device and a volume of space associated with a second device;
creating, by the external detection device, a first recording, wherein the first recording comprises a first action being performed by a user, and wherein the first action is performed in the volume of space associated with the first device and without touching the first device;
analyzing the first recording;
interpreting, based on analyzing the first recording, the first action as a command to select state information of a software program residing in the first device;
selecting, based on interpreting the first action, the state information of the software program residing in the first device;
creating, by the external detection device and after creating the first recording, a second recording, wherein the second recording comprises a second action being performed by the user, and wherein the second action is performed in the volume of space associated with the second device and without touching the second device;
analyzing the second recording;
interpreting, based on analyzing the second recording, the second action as a command to transfer the state information from the first device to the second device; and
transferring, based on interpreting second action, the state information of the software program to the second device.

2. The method of claim 1, wherein the external detection device is at least one camera configured to record the first action and the second action, wherein the at least one camera is operatively connected to a computer system configured to interpret the first action and the second action.

3. The method of claim 1, further comprising:
storing the state information in a detection object.

4. The method of claim 3, wherein the detection object is configured to identify and communicate with the first device and the second device, and further configured to interpret the first action and the second action.

5. The method of claim 3, wherein the detection object is one selected from a group consisting of a wristwatch, a ring, and a wristband.

6. The method of claim 3, wherein the first device, the second device, and the detection object form a mesh network.

7. The method of claim 1, wherein the first action is a physical gesture.

8. The method of claim 7, wherein the physical gesture is one selected from a group consisting of a clockwise rotation of a hand, a counterclockwise rotation of a hand, a grabbing gesture of a hand, and a dropping gesture of a hand.

9. The method of claim 1, wherein the volume of space associated with the first device is an area of three-dimensional space directly above the first device, and the volume of space associated with the second device is an area of three-dimensional space directly above the second device.

10. The method of claim 1, further comprising:
establishing, in response to interpreting the first action and the second action, a direct link between the first device and the second device.

11. The method of claim 1, wherein selecting the state information of the software program further comprises denoting digital content on the first device for transfer at a later point in the time.

12. A system for transferring digital content, comprising:
a computer system communicatively connected to an external detection device and configured to:
define, by the external detection device, a volume of space associated with a first device and a volume of space associated with a second device;
analyze a first recording, wherein the first recording comprises a first action being performed by a user, and wherein the first action is performed in the volume of space associated with the first device and without touching the first device;
interpret, based on analyzing the first recording, the first action as a command to select state information of a software program residing in the first device;
select, based on interpreting the first action, the state information of the software program residing in the first device;
analyze a second recording, wherein the second recording comprises a second action being performed by the user, and wherein the second action is performed in the volume of space associated with the second device and without touching the second device;
interpret, based on analyzing the second recording, the second action as a command to transfer the state information from the first device to the second device;
transfer, based on interpreting second action the state information of the software program to the second device; and
an external detection device configured to:
create the first recording of the first action; and
create, after creating the first recording, the second recording of the second action.

13. The system of claim 12, wherein the volume of space associated with the first device is an area of three-dimensional space directly above the first device, and the volume of space associated with the second device is an area of three-dimensional space directly above the second device.

14. The system of claim 12, wherein the computer system is further configured to store the state information captured from the first device.

15. The system of claim 12, wherein the first action is a physical gesture.

16. The system of claim 15, wherein the physical gesture is one selected from a group consisting of a clockwise rotation of a hand, a counterclockwise rotation of a hand, a grabbing gesture of a hand, and a dropping gesture of a hand.

17. The system of claim 12, wherein the external detection device is at least one camera.

18. The system of claim 12, further comprising:
a detection object configured to store the state information, wherein the detection object is one selected from a group consisting of a wristwatch, a ring, and a wristband.

19. The system of claim 12, wherein the computer system further comprises functionality to:
establish, in response to interpreting the first action and the second action, a direct link between the first device and the second device.

20. The system of claim 12 wherein the first device, the second device, and the external detection device form a mesh network.

* * * * *